United States Patent
Versteeg et al.

(10) Patent No.: US 10,084,762 B2
(45) Date of Patent: *Sep. 25, 2018

(54) PUBLICLY READABLE BLOCKCHAIN REGISTRY OF PERSONALLY IDENTIFIABLE INFORMATION BREACHES

(71) Applicant: CA, Inc., New York, NY (US)

(72) Inventors: Steven Cornelis Versteeg, Ivanhoe (AU); Nathan Allin Hastings, Glen Iris (AU); Xien Yao, Doncaster (AU); John Sinclair Bird, Ringwood North (AU)

(73) Assignee: CA, INC., New York, NY (US)

(*) Notice: Subject to any disclaimer, the term of this patent is extended or adjusted under 35 U.S.C. 154(b) by 197 days.

This patent is subject to a terminal disclaimer.

(21) Appl. No.: 15/254,474

(22) Filed: Sep. 1, 2016

(65) Prior Publication Data

US 2018/0063099 A1    Mar. 1, 2018

(51) Int. Cl.
| | |
|---|---|
| *H04L 29/06* | (2006.01) |
| *H04L 9/32* | (2006.01) |
| *G06F 21/62* | (2013.01) |
| *G06F 17/30* | (2006.01) |

(52) U.S. Cl.
CPC ........ *H04L 63/06* (2013.01); *G06F 17/30424* (2013.01); *G06F 21/6263* (2013.01); *H04L 9/3247* (2013.01); *H04L 63/08* (2013.01)

(58) Field of Classification Search
CPC ..................................................... H04L 63/06
USPC ........................................................ 713/170
See application file for complete search history.

(56) References Cited

U.S. PATENT DOCUMENTS

| | | | |
|---|---|---|---|
| 9,077,747 B1* | 7/2015 | Chen | H04L 63/1441 |
| 2007/0223706 A1† | 9/2007 | Gantman et al. | |
| 2008/0184349 A1* | 7/2008 | Ting | H04L 9/3231 726/7 |
| 2011/0083181 A1* | 4/2011 | Nazarov | G06F 21/562 726/23 |
| 2017/0063884 A1† | 3/2017 | Seigel | |
| 2017/0316390 A1† | 11/2017 | Smith et al. | |

OTHER PUBLICATIONS

"Yahoo reveals coordinated attack on Yahoo Emails—encourages Password reset," CyberCrime & Doing Time, Jan. 31, 2014. Available at: http://garwarner.blogspot.com/2014/01/yahoo-reveals-coordinated-attack-on.html.

* cited by examiner
† cited by third party

*Primary Examiner* — Longbit Chai
(74) *Attorney, Agent, or Firm* — Shook, Hardy & Bacon L.L.P.

(57) ABSTRACT

A registry is utilized to identify personally identifiable information (PII) that has been breached. The registry is a distributed database shared by multiple organizations to track which PII has been breached in other organizations. A first service provider initially receives PII and corresponding signed descriptor from a user. The PII is used to verify an identity of the user and the signed descriptor describes the type of PII that is received. The first service provider queries the registry to determine if the signed descriptor of the user has been written to the registry by a second service provider, indicating that it has been breached at a service provided by the second service provider. If the first service provider uses the breached PII, the breached PII is invalidated by the first service provider.

19 Claims, 5 Drawing Sheets

PUBLICLY READABLE BLOCKCHAIN REGISTRY OF PERSONALLY IDENTIFIABLE INFORMATION BREACHES

CROSS-REFERENCE TO RELATED APPLICATIONS

This Application is related to commonly assigned U.S. patent application entitled "Password Breach Registry" Ser. No. 15/254,464, filed concurrently herewith on the same date.

BACKGROUND

The vast majority of websites and applications accessible via the Internet or a mobile device offer some sort of sign in or sign up functionality. This functionality enables a user of a particular website or application to create an account or access the account associated with the respective service provided by the website or application. Personally identifiable information (PII) is often used by organizations to authenticate a user's identity. For example, PII may include information such as full names, home address, social security numbers, date of birth, and biometrics, as well as non-public information (e.g., mother's maiden name). Organizations typically store PII associated with the user accounts in some variety of database or directory. As the increasing rate of data breaches provide constant reminders, these databases or directories can be accessed by malicious actors exposing the users to identity theft and fraud.

To add to this problem, users often reuse the same PII on multiple websites or applications. This creates a security issue where a breach in one organization may enable a malicious actor to compromise accounts at other organizations. For example, using breached PII, malicious actors recently stole tax refunds from approximately 104,000 people.

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of the present disclosure relate to utilizing a registry to identify PII that has been breached. The registry is a distributed database shared by multiple organizations as a means of tracking which PII has been breached in other organizations. A first service provider initially receives PII and corresponding signed descriptor from a user. While the PII is used by the first service provider to verify an identity of the user, the signed descriptor describes the type of PII (e.g., fingerprint, mother's maiden name, birth date, etc.) that is received. The first service provider can query the registry to determine if the signed descriptor of the user has been written to the registry by a second service provider, indicating that it has been breached at a service provided by the second service provider. If the first service provider uses the breached PII, the breached PII is invalidated by the first service provider.

BRIEF DESCRIPTION OF THE DRAWINGS

The present disclosure is described in detail below with reference to the attached drawing figures, wherein.

DETAILED DESCRIPTION

Figure 1:
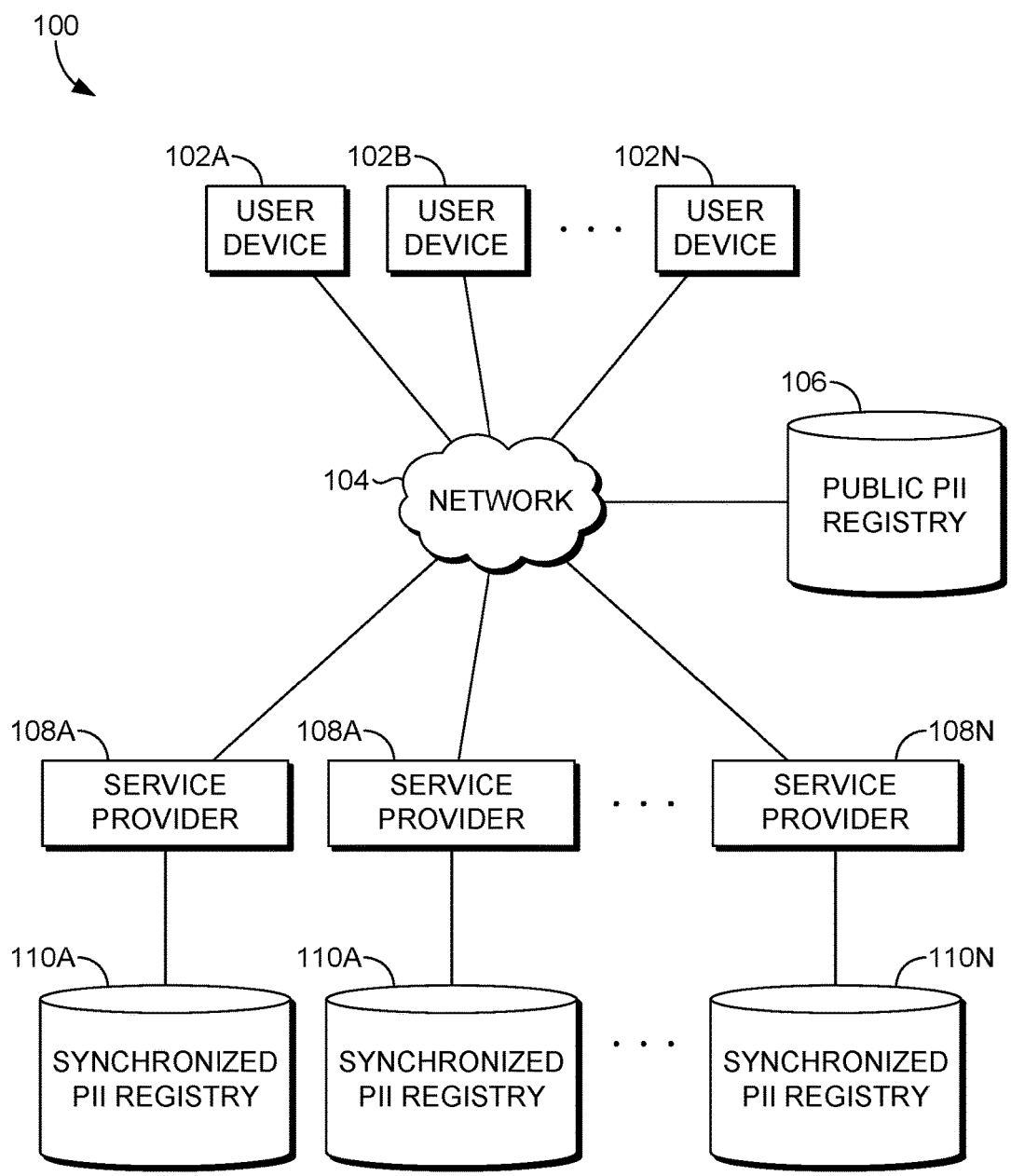
FIG. 1 is a block diagram showing a PII registry system for utilizing a PII blockchain registry to identify PII that has been breached, in accordance with an embodiment of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

As noted in the background, PII is often used by organizations to authenticate a user's identity. For example, PII may include information such as full name, home address, social security number, date of birth, biometrics, or mother's maiden name. The PII is typically stored by organizations in some variety of database or directory. As the rate of data breaches increases, these databases or directories can be accessed by malicious actors exposing the users to identity theft and fraud. Because users often use the same PII for multiple accounts provided by multiple providers, a breach in one organization may enable a malicious actor to compromise accounts at other organizations.

Embodiments of the present disclosure are generally directed to utilizing a registry to identify PII that has been breached. In this way, users are protected from malicious actors that have stolen PII from a breached service by preventing the malicious actors from using the stolen PII to commit identity theft and fraud. Signed descriptors that identify the type of PII that has been compromised (without revealing the content of the PII) are published to the registry by the breached service provider. The registry is a distributed database shared by multiple organizations as a means of tracking which PII has been breached in other organizations. For example, the registry may be a blockchain-like format which, as explained in more detail below, prevents tampering and revision. A provider may periodically query the registry to determine if the signed descriptor of the user has been written to the registry by a second service provider. If the first service provider uses the breached PII, the breached PII is invalidated by the first service provider.

For example, assume a user signs up for both GMAIL and EBAY accounts and happens to use the PII on both sites. If an attacker is able to compromise a service provided by EBAY and steal EBAY PII, the attacker may be able to access the GMAIL account. To prevent additional attacks, when EBAY discovers the breach, EBAY can publish signed descriptors for PII that was potentially breached. If GMAIL is monitoring the registry, GMAIL is able to determine which PII was breached and take steps to deny an attacker any access using the breached PII.

To make public the fact that PII has been breached, without releasing any information which reveals the actual PII to the general public, EBAY may publish signed descriptors that describe PII thought to have been compromised. As a subscriber to the registry, GMAIL searches for any signed descriptors which match signed descriptors in its own repository. GMAIL may then automatically deny access using the corresponding PII and force the affected users to provide new PII. In embodiments, these proactive measures may be accomplished via email, SMS, in-person, and the like.

Accordingly, one embodiment of the present disclosure is directed to a non-transitory computer storage medium storing computer-useable instructions that, when used by a computing device, causes the computing device to perform operations to facilitate invalidating PII that has been breached. The operations comprise receiving, at a first service provider, PII and corresponding signed descriptor from a user. The PII is used by the first service provider to verify an identity of the user. The operations also comprise querying a synchronized blockchain registry to determine if the PII of the user has been breached. The synchronized blockchain registry includes signed descriptors for a plurality of users from a plurality of service providers indicating PII that has been breached via services offered by the plurality of service providers. The operations further comprise, upon determining the PII of the user has been breached, invalidating the PII for the user.

In another embodiment, the present disclosure is directed to a computer-implemented method to facilitate utilizing a PII blockchain registry to identify PII that has been breached. The method comprises subscribing, by a service provider, to a publicly available blockchain registry. The publicly available blockchain registry includes signed descriptors for a plurality of users from a plurality of service providers. A synchronized blockchain registry is synchronized with the publicly available blockchain registry. The synchronizing updates the synchronized blockchain registry to include updates provided by the plurality of service providers to the publicly available blockchain registry. The updates identify signed descriptors for the plurality of users indicating the PII corresponding to the signed descriptors that has been breached for the plurality of users.

In yet another embodiment, the present disclosure is directed to a computerized system for facilitating utilizing a password breach registry to secure a service. The system includes a processor and a computer storage medium storing computer-useable instructions that, when used by the processor, cause the processor to subscribe, by a service provider, to a publicly available blockchain registry. The publicly available blockchain registry includes signed descriptors for a plurality of users from a plurality of service providers. A synchronized blockchain registry is synchronized with the publicly available blockchain registry to update the synchronized blockchain registry to include updates provided by the plurality of service providers to the publicly available blockchain registry. The updates identify signed descriptors for the plurality of users indicating the PII corresponding to the signed descriptors that has been breached for the plurality of users. The synchronized blockchain registry can be queried to determine if PII for a user of the service provider has been breached. Upon determining PII for a user has been breached, the user is requested to provide new PII and corresponding signed descriptors.

Referring now to FIG. 1, a block diagram is provided that illustrates a PII registry system 100 for utilizing a PII registry to identify PII that has been breached, in accordance with an embodiment of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The PII registry system 100 may be implemented via any type of computing device, such as computing device 500 described below with reference to FIG. 5, for example. In various embodiments, the PII registry system 100 may be implemented via a single device or multiple devices cooperating in a distributed environment.

The PII registry system 100 generally operates to provide a PII registry that enables subscribers to query the PII registry and identify when PII of users may have been breached at other services. As shown in FIG. 1, the PII registry system 100 includes, among other components not shown, user devices 102A-102N, a public PII registry 106, service providers 108A-108N, and synchronized PII registries 110A-110N. It should be understood that the PII registry system 100 shown in FIG. 1 is an example of one suitable computing system architecture. Each of the components shown in FIG. 1 may be implemented via any type of computing device, such as computing device 500 described with reference to FIG. 5, for example.

The components may communicate with each other via a network 104, which may include, without limitation, one or more local area networks (LANs) and/or wide area networks (WANs). Such networking environments are commonplace in offices, enterprise-wide computer networks, intranets, and the Internet. It should be understood that any number of user devices, password breach registries, and service providers may be employed within the PII registry system 100 within the scope of the present disclosure. Each may comprise a single device or multiple devices cooperating in a distributed environment. For instance, the PII registry 106 may be provided via multiple devices arranged in a distributed environment that collectively provide the functionality described herein. Additionally, other components not shown may also be included within the network environment.

As shown in FIG. 1, the PII registry system 100 includes a PII registry 106. While only a single PII registry 106 is shown in FIG. 1, it should be understood that the PII registry system 100 may employ any number of PII registries. The service providers 108A-108N may publish signed descriptors corresponding to breached PII to the PII registry 106 to prevent malicious actors from committing identify theft or fraud by utilizing the breached PII.

In embodiments, the PII registry 106 is in a blockchain-like format that prevents tampering and revision. The blockchain-like format provides a publicly accessible distributed database that maintains a continuously growing list of data blocks. Each data block contains time-stamped batches of transactions and a hash of the prior block. This enables the blocks to be linked together to form a chain. The transactions are the content (e.g., signed descriptors) that is stored in the PII registry 106 and are provided via service providers 108A-108N or user devices 102A-102N. A service provider 108A-108N or user device 102A-102N is able to connect to the MI registry 106 via the network 104, send new transactions to it, verify transactions, create new blocks, and synchronize with a local copy of the PII registry (e.g., the synchronized PII registries 110A-110N).

Each service provider 108A-108N or user device 102A-102N can maintain a local copy of the PII registry (e.g., the synchronized PII registries 110A-110N). Transactions may be provided to the synchronized PII registries 110A-110N and broadcast to the PII registry 106. Each service provider 108A-108N having a synchronized PII registry 110A-110N may receive the broadcasted transactions. Accordingly, there is no need to have a centralized database managed by a trusted third party. Transactions can be broadcast to the network using software applications. As a service provider validates transactions, the transactions are added to the local copy and broadcast to other service providers. Alternatively, each service provider 108A-108N having a synchronized PII registry 110A-110N may periodically or on an ad hoc basis synchronize with the PII registry 106.

The synchronized PII registry 110A-110N can be queried periodically or on an ad hoc basis to determine whether any signed descriptors match a signed descriptor that corresponds to PII of a user of a service provided by service provider(s) 108A-108N. Querying only the synchronized PII registry 110A-110N enables the service provider(s) 108A-108N or user device(s) 102A-102N to maintain privacy over the queries that might otherwise reveal what PII the service provider or user utilizes if the queries were instead run against the PII registry 106.

In embodiments, the PII registry system 100 enables each subscribing service provider 108A-108N to query the latest version of the password breach registry, even though a breached service provider may publish signed descriptors to the synchronized PII registry 110A-110N, which may then be broadcast to the PII registry 106. A subscribing service provider 108A-108N may determine, with reasonable certainty, whether a transaction (i.e., a signed descriptor corresponding to a user of the subscribing service provider) does or does not exist in the data set which enables the service provider to readily identify whether any users of its service utilize PII that has been breached at a service provided by another service provider.

Further, because of the blockchain-like format, there is a prohibitively high cost to attempt to rewrite or alter transaction history. This prevents a malicious actor from modifying or removing signed descriptors that have already been written to the PII registry 106. For example, if a signed descriptor has been written to the PII registry 106 indicating a user of a service has had its PII stolen, a malicious actor cannot simply modify or remove the signed descriptor. Rather, since it has already published to the blockchain, other service providers are able to take steps to protect services they provide that the user accesses with the same PII.

For clarity, a signed descriptor is a standardized description that describes the type of PII that has been received and/or breached. For example, the signed descriptor for PII that is the user's mother's maiden name might be "Mother's Maiden Name." In another example, the signed descriptor for PII that is the user's fingerprint might be "Fingerprint." In yet another example, the signed descriptor for PII that is the user's birth date might be "Birth Date." In this way, if PII has been leaked, the breached service provider publishes the signed descriptor to the PII registry 106 and the actual PII that has been breached is not revealed to the public. This allows other service providers to prevent the affected user(s) from utilizing the breached PII at other services and also prevents malicious actors from committing identity theft and fraud at those services.

In embodiments, users have a public and private key pair. When a user provides any PII to a service provider 108A-108N, the user also provides a signed descriptor of the PII that has been provided. The signed descriptor is signed with the private key. As mentioned above, a standardized representation for signed descriptors is used so that the same PII used by different organizations will have the same descriptors. The descriptor includes an identifier for the person (e.g., their public key, or some other unique label) and a standardized description of the PII provided. The signing of the PII descriptor with the user's private key creates a token which can only be provided by the user. This prevents denial of service attacks where attackers falsely claim PII to have been leaked.

The service provider 108A-108N securely stores both the PII and the signed PII descriptor. As described above, in the event of a breach of the service provider, the service provider updates the PII registry 106 with the signed descriptors of any users who had their PII breached.

If other service providers 108A-108N, upon checking the PII registry 106, discover that any of their users have had their PII breached, then they will activate their own internal process. For example, the service provider may immediately make the breached PII invalid for use with authentication. Additionally or alternatively, the service provider may contact the user to ask them to provide new PII (e.g., if the user's right index fingerprint was breached, they may ask for the print of another finger). Because the user may have provided different subsets of PII to different service providers, it is possible that only a subset of the breached PII is being used by other service providers.

If a non-breached service provider holds a sufficient amount of non-breached PII for a user to still securely authenticate, the additional PII may be provided by the user through an online system, once the user has authenticated. However, if a non-breached service provider holds an insufficient amount of non-breached PII to securely authenticate the user, then another procedure may need to be invoked. For example, the user may be required to visit the service provider in person with official identification documentation and then update their PII.

Users may also write to the PII registry 106 directly. If a user suspects that any of their PII has been breached, they may write the signed descriptors of the corresponding PII to the PII registry 106. As described above, the signed descriptors can only be generated with possession of the private key. This means only service providers which have been given the signed descriptors, the user, or an attacker who has obtained a stolen copy of either the signed descriptors or the user's private key (i.e., there has been a breach) may update the list of breached PII in the PII registry 106 for a particular user.

The user's private key needs to be stored securely. If the private key is stolen, then an attacker may update the PII registry 106 to list all of the user's PII as breached, thereby denying that user access to any services where the user uses PII for authentication. When a user's private key is stolen, the user may write a special "private key breach" message to the PII registry 106. The private key breach message should include the user's public key and be signed with the user's private key. Once a private key breach message is written to the PII registry 106, then the user's public key becomes completely invalid. The user then needs to relink or associate the user's identity to a new public-private key pair. Any of the user's PII which was actually breached (as opposed to signed descriptors of PII not actually breached but written to the registry with the stolen key) should have new signed descriptors written to the PII registry 106 signed with the new private key.

For enhanced security against the user's private key being stolen, in some embodiments, the user's private key is stored in an electronic key fob. In this way, the private key is stored in a secure hardware device (i.e., the key fob). Signing can be accomplished using the key fob and the private key never leaves the key fob. In some embodiments, client tools are provided for desktop, laptop, and mobile devices that allow signed descriptors to be generated by the user in a user-friendly and intuitive way, making the private-public key cryptography transparent to the user.

In some embodiments, the PII registry system 100 is not reliant on the breached service provider to update the PII registry 106. Rather, if the user suspects PII has been breached, the user may update the PII registry 106. Similarly, another service provider can update the PII registry 106 if it suspects PII has been breached at another service provider. The only requirement to update the PII registry 106 is to have a signed descriptor of the PII. Since the signed descriptor can only be generated by the holder of the private key (which in most cases, is only the user), the only actors who should have a copy of the signed descriptor is the user and service providers with whom the user has shared PII. As can be appreciated, the signed descriptor should be kept securely by any entity that receives it and only after PII is breached should the signed descriptor become public (i.e., when it is written to the PII registry 106).

In some embodiments, the service provider is required to include their identity so that the origin of the breach is known. In other embodiments, the service provider may write to the PII registry 106 anonymously to encourage disclosure of breaches without penalty to the breached service provider.

Figure 2:
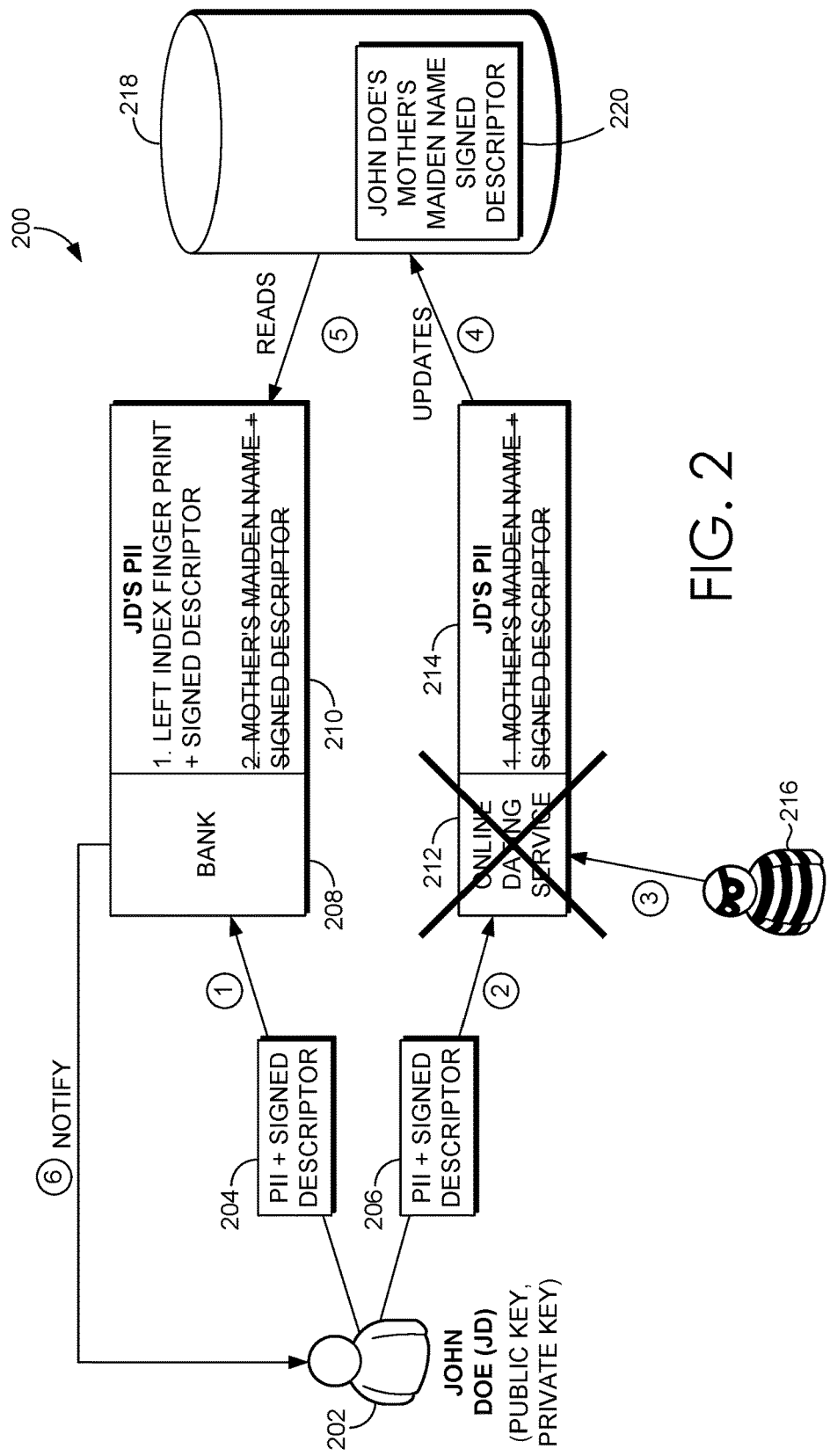
FIG. 2 is a flow diagram showing an exemplary PII registry that can be utilized to prevent a breach at a second site after a first site has been breached, in accordance with an embodiment of the present disclosure.

In practice, and referring now to FIG. 2, John Doe 202 opens a bank account. He provides the bank 208 with PII (e.g., his left index finger print and his mother's maiden name) and signed descriptors 204 that identify the type of PII being provided. The bank 208 stores the PII and signed descriptors 204 in a data store 210 and uses this information for authentication processes.

Next, John Doe 202 opens an account with an online dating service 212. He provides the dating service 212 with PII (e.g., his mother's maiden name) and a signed descriptor 206 that identifies the type of PII being provided (note this is the same descriptor as sent to the bank). The dating service 212 stores the PII and signed descriptor in a data store 214 and may ask John Doe his mother's maiden name if he needs to recover his password.

Assume at some point, the online dating service 212 is breached and all user account information is stolen by a malicious actor 216. The online dating service 212 updates the registry 218 with signed descriptors 220 of all the PII (which includes the identifier described above) which was breached. In this example, the signed descriptor of John Doe's mother's maiden name 220 is added to the registry 218. When the bank 208 updates its copy of the registry, the bank 208 notices that John Doe's mother's maiden name has been breached.

To prevent additional damage, the bank 208 executes its process for third-party PII data breaches. John Doe's mother's maiden name is invalidated by the bank 208 for authentication. The bank notifies John Doe that his security information needs to be updated. If the bank 208 has sufficient non-breached PII for John Doe (e.g., John Doe's fingerprint and password), the bank 208 may allow John Doe to provide those security credentials through the bank's online systems. If there is insufficient non-breached security information to authenticate John Doe, John Doe may be asked to come into a branch to verify his identity with physical documentation and to update his security credentials.

Figure 3:
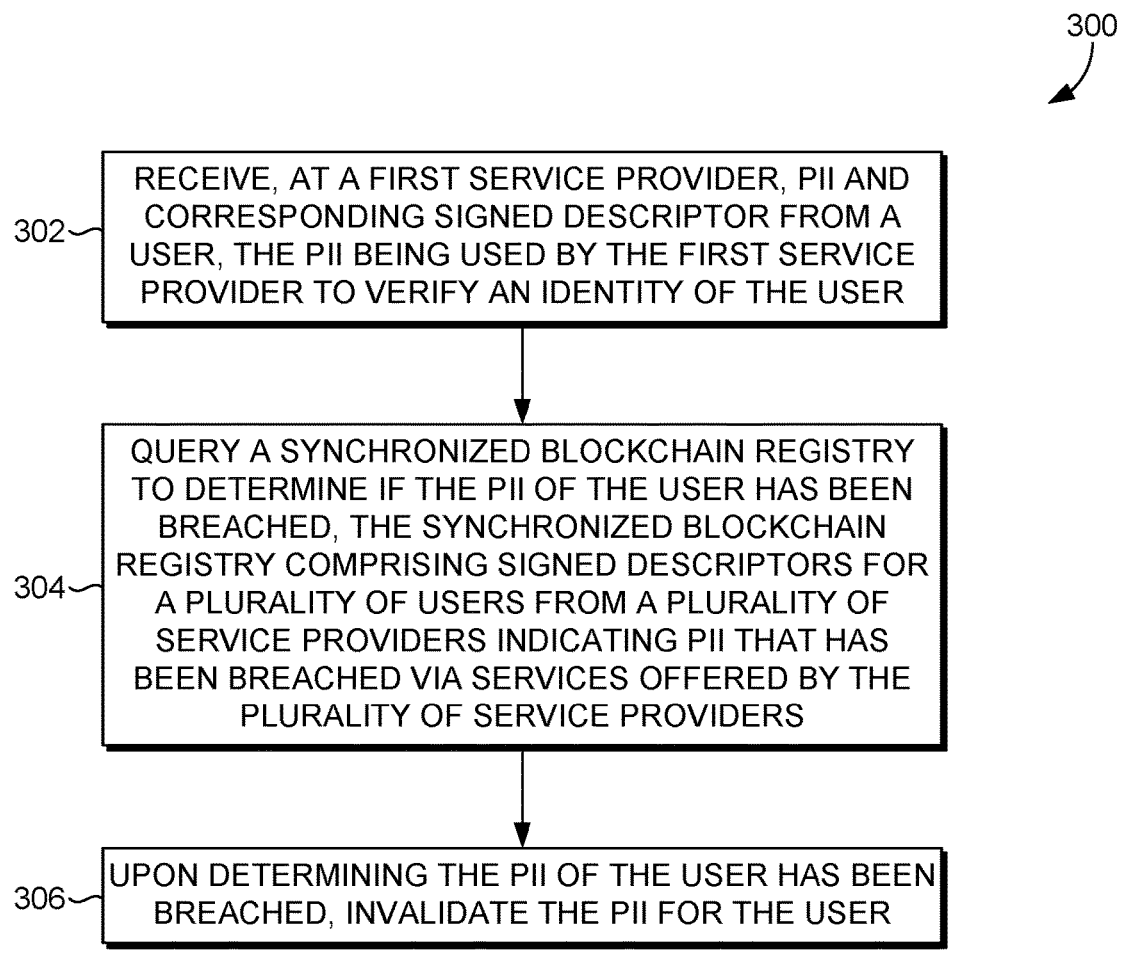
FIG. 3 is a flow diagram showing a method for invalidating PII that has been breached, in accordance with an embodiment of the present disclosure.

Turning now to FIG. 3, a flow diagram is provided that illustrates a method 300 for invalidating PII that has been breached, in accordance with an embodiment of the present disclosure. For instance, the method 300 may be employed utilizing the PII registry system 100 of FIG. 1. As shown at step 302, a first service provider receives personally identifiable information (PII) and corresponding signed descriptor from a user. The PII can be used by the first service provider to verify an identity of the user. The signed descriptor describes the type of PII (e.g., fingerprint, mother's maiden name, birth date, etc.) that is received. Client tools are provided, in some embodiments, that generate signed descriptors for the PII transparently to the user. Additionally or alternatively, each signed descriptor can only be generated with possession of a private key of the user.

At step 304, a PII registry (e.g., a synchronized blockchain registry) is queried to determine if the PII of the user has been breached. The PII includes signed descriptors for a plurality of users from a plurality of service providers indicating PII that has been breached via services offered by the plurality of service providers. By relying on the signed descriptors rather than the actual PII, the PII is not revealed to the publicly available blockchain registry or the synchronized blockchain registry.

In embodiments, a synchronized blockchain registry is utilized so the first service provider can avoid revealing details about the queries (i.e., which signed descriptors are provided by users of a service provided by the first service provider). To do so, the synchronized blockchain registry is synchronized with a publicly available blockchain registry. In this way, each service provider can maintain its own synchronized blockchain registry. In some embodiments, the publicly available blockchain registry includes an identification of a breach origin. In other embodiments, the publicly available blockchain registry enables an identification of a breach origin to remain anonymous.

Upon determining the PII of the user has been breached, the PII is invalided, at step 306, for the user. In some embodiments, the first service provider requests that the user provide new PII and corresponding signed descriptor. For example, the new PII and corresponding signed descriptor might be requested upon the user authenticating with the first service provider using non-breached PII to verify the identity of the user. In another example, the new PII and corresponding signed descriptor might be requested via communication initiated by the first service provider. In yet another example, the new PII and corresponding signed descriptor is requested via in person communication with the first service provider.

In some embodiments, the first service provider may query a synchronized blockchain registry for a private key message. The private key message is written to the publicly available blockchain registry by the user indicating that a private key of the user has been stolen. The private key message may include a public key of the user that has been signed with a private key of the user. Upon identifying the private key message for the user, the first service provider may invalidate the public key of the user. Additionally, the first service provider may request that the user associate a new public-private key pair with a user identification.

Figure 4:
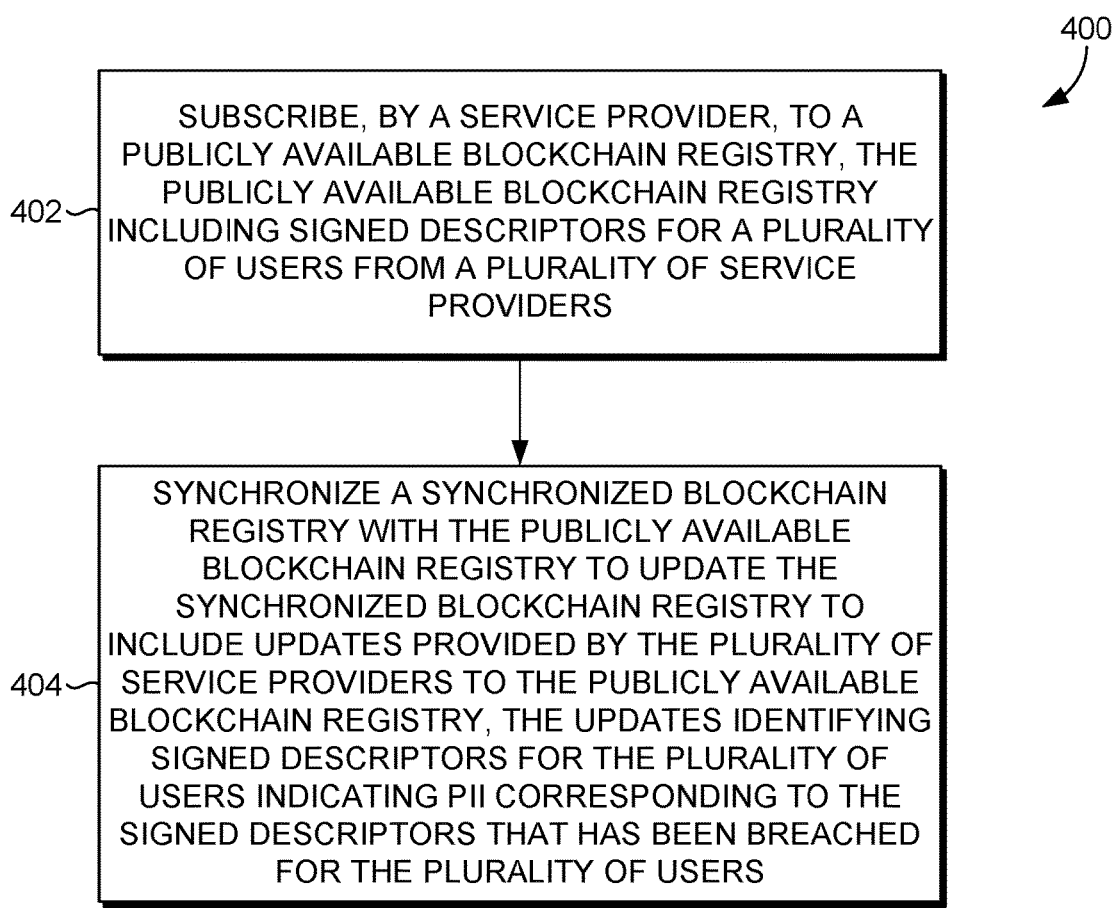
FIG. 4 is a flow diagram showing a method for utilizing a PII blockchain registry to identify PII that has been breached, in accordance with an embodiment of the present disclosure.

Referring now to FIG. 4, a flow diagram is provided that illustrates a method 400 for utilizing a PII blockchain registry to identify PII that has been breached, in accordance with an embodiment of the present disclosure. For instance, the method 400 may be employed utilizing the PII registry system 100 of FIG. 1. As shown at step 402, a service provider subscribes to a publicly available blockchain registry. The publicly available blockchain registry includes signed descriptors for a plurality of users from a plurality of service providers. As described above, the signed descriptors describe the type of PII that may have been stolen from the plurality of service providers. By subscribing to the publicly available blockchain registry, the subscribing service provider can ensure that the same PII is not used for a service provided by the service provider (e.g., using the PII to verify the identity of a user).

A synchronized blockchain registry is synchronized, at step 404, with the publicly available blockchain registry. The synchronization updates the synchronized blockchain registry to include updates provided by the plurality of service providers to the publicly available blockchain registry. The updates identify signed descriptors for the plurality of users indicating PII corresponding to the signed descriptors that has been breached for the plurality of users.

The service provider may query the synchronized blockchain registry to determine if PII for the user of the service provider has been breached. To do so, the service provider may query the synchronized blockchain registry to determine if a signed descriptor provided by the user to the service provider has been written to the synchronized blockchain registry. Upon determining PII for a user has been breached, the service provider may request that the user provide new PII and corresponding signed descriptors. As can be appreciated, this may prevent a malicious actor from committing identity theft or fraud at a service provided by the service provider for the affected user.

Figure 5:
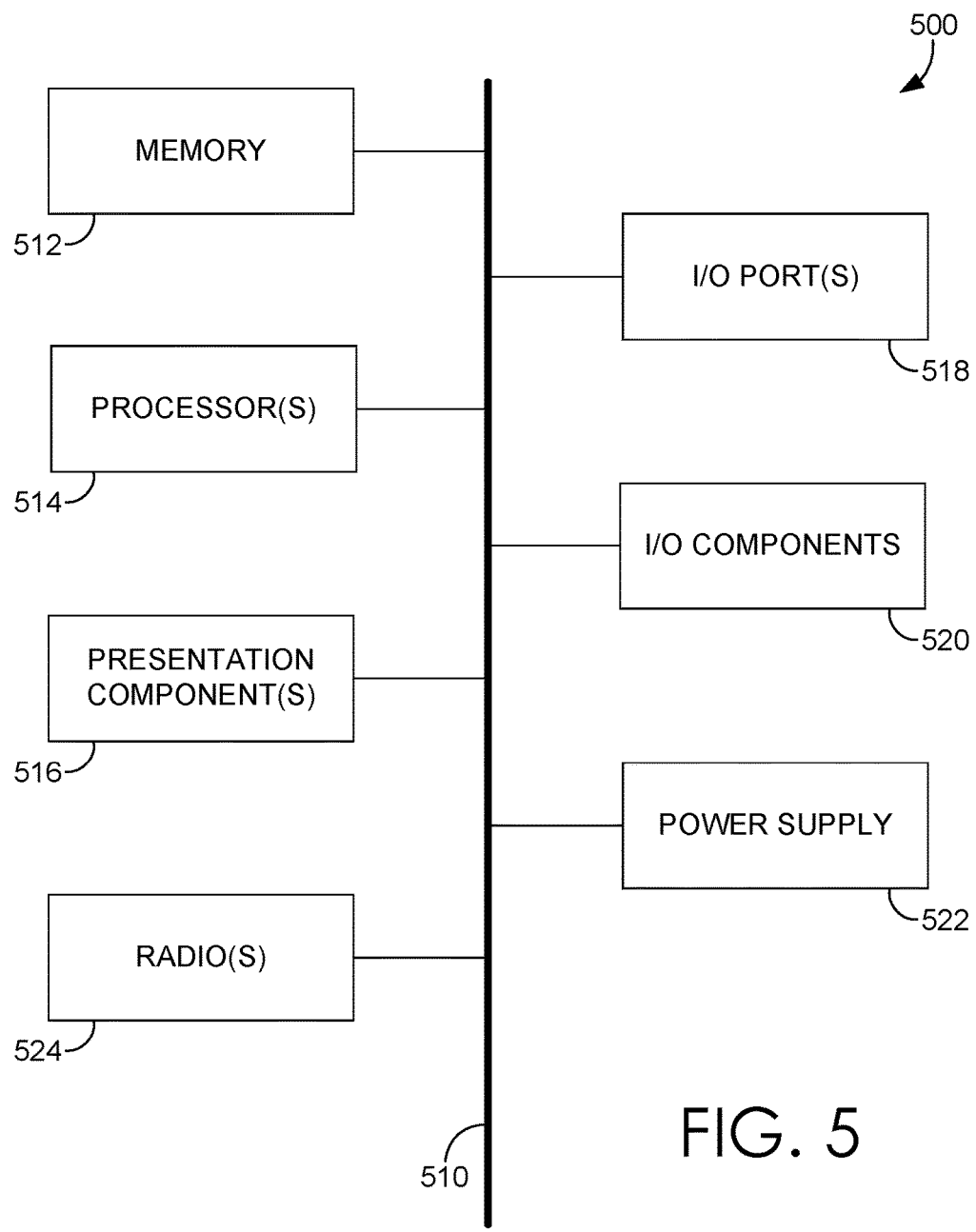
FIG. 5 is a block diagram of an exemplary computing environment suitable for use in implementing embodiments of the present disclosure.

Having described embodiments of the present disclosure, an exemplary operating environment in which embodiments of the present disclosure may be implemented is described below in order to provide a general context for various aspects of the present disclosure. Referring to FIG. 5 in particular, an exemplary operating environment for implementing embodiments of the present disclosure is shown and designated generally as computing device 500. Computing device 500 is but one example of a suitable computing environment and is not intended to suggest any limitation as to the scope of use or functionality of the inventive embodiments. Neither should the computing device 500 be interpreted as having any dependency or requirement relating to any one or combination of components illustrated.

The inventive embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The inventive embodiments may be practiced in a variety of system configurations, including handheld devices, consumer electronics, general-purpose computers, more specialty computing devices, etc. The inventive embodiments may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, input/output (I/O) components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As can be understood, embodiments of the present disclosure provide for an objective approach for utilizing a PII blockchain registry to identify PII that has been breached. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-executable instructions that, when executed by a computing device, causes the computing device to perform operations, the operations comprising:
    subscribing, by a first service provider, to a publicly available blockchain registry, which includes a plurality of signed descriptors for a plurality of users from a plurality of service providers;
    synchronizing a new transaction to a local copy of a blockchain registry associated with the first service provider to create a synchronized local blockchain registry;
    synchronizing the synchronized local blockchain registry with the publicly available blockchain registry to update the synchronized local blockchain registry to include updates provided by the plurality of service providers to the publicly available blockchain registry, wherein the updates identifying signed descriptors for the plurality of users indicating personally identifiable information (PII) corresponding to the signed descriptors that has been breached;
    querying the updated and synchronized local blockchain registry to determine if the PII for a user of the first service provider has been breached; and
    in response to the query, upon comparing and determining PII for the user has been breached, request the user to provide new PII and corresponding signed descriptors to the first service provider.

2. The computer storage medium of claim 1, further comprising requesting the user to provide new PII and corresponding signed descriptor.

3. The computer storage medium of claim 2, wherein the new PII and corresponding signed descriptor is requested upon the user authenticating with the first service provider using non-breached PII to verify the identity of the user.

4. The computer storage medium of claim 2, wherein the new PII and corresponding signed descriptor is requested via communication initiated by the first service provider.

5. The computer storage medium of claim 2, wherein the new PII and corresponding signed descriptor is requested via in-person communication with the first service provider.

6. The computer storage medium of claim 5, further comprising providing client tools that generate signed descriptors for the PII transparently to the user.

7. The computer storage medium of claim 6, wherein each signed descriptor can only be generated with possession of a private key of the user.

8. The computer storage medium of claim 1, further comprising querying the synchronized local blockchain registry for a private key message, the private key message being written to a publicly available blockchain registry by the user indicating that a private key of the user has been stolen.

9. The computer storage medium of claim 8, wherein the private key message includes a public key of the user that has been signed with a private key of the user.

10. The computer storage medium of claim 8, further comprising, upon identifying the private key message for the user, invalidating a public key of the user.

11. The computer storage medium of claim 10, further comprising requesting the user to associate a user identification with a new public-private key pair.

12. The computer storage medium of claim 1, wherein the publicly available blockchain registry includes an identification of a breach origin.

13. The computer storage medium of claim 1, wherein the publicly available blockchain registry enables an identification of a breach origin to remain anonymous.

14. A computer-implemented method comprising:
    subscribing, by a first service provider, to a publicly available blockchain registry, which includes a plurality of signed descriptors for a plurality of users from a plurality of service providers;
    synchronizing a new transaction to a local copy of a blockchain registry associated with the first service provider to create a synchronized local blockchain registry;
    synchronizing the synchronized local blockchain registry with the publicly available blockchain registry to update the synchronized local blockchain registry to include updates provided by the plurality of service providers to the publicly available blockchain registry, wherein the updates identifying signed descriptors for the plurality of users indicating personally identifiable information (PII) corresponding to the signed descriptors that has been breached;

querying the updated and synchronized local blockchain registry to determine if the PII for a user of the first service provider has been breached; and in response to the query, upon comparing and determining PII for the user has been breached, request the user to provide new PII and corresponding signed descriptors to the first service provider.

15. The method of claim 14, further comprising querying the synchronized blockchain registry to determine if PII for the user of the service provider has been breached.

16. The method of claim 15, wherein the querying includes determining if a signed descriptor provided by the user to the service provider has been written to the synchronized blockchain registry.

17. The method of claim 15, further comprising, upon determining PII for a user has been breached, requesting the user to provide new PII and corresponding signed descriptors.

18. The method of claim 14, wherein the PII is used by the service provider to verify an identity of the user.

19. A computerized system comprising:

a hardware processor; and non-transitory computer storage media storing computer-executable instructions that, when executed by the hardware processor, cause the hardware processor to:

subscribe, by a first service provider, to a publicly available blockchain registry, which includes a plurality of signed descriptors for a plurality of users from a plurality of service providers;

synchronize a new transaction to a local copy of a blockchain registry associated with the first service provider to create a synchronized local blockchain registry;

synchronize the synchronized local blockchain registry with the publicly available blockchain registry to update the synchronized local blockchain registry to include updates provided by the plurality of service providers to the publicly available blockchain registry, wherein the updates identifying signed descriptors for the plurality of users indicating personally identifiable information (PII) corresponding to the signed descriptors that has been breached;

query the updated and synchronized local blockchain registry to determine if the PII for a user of the first service provider has been breached; and in response to the query, upon comparing and determining PII for the user has been breached, request the user to provide new PII and corresponding signed descriptors to the first service provider.

* * * * *